Feb. 16, 1971   J. C. HARDY ET AL   3,562,809
FLOATING YOKE CABLE RESTRAINT SYSTEM FOR A PRESSURIZED SUIT
Filed Dec. 20, 1968   2 Sheets-Sheet 2
FIG. 6 FRONT
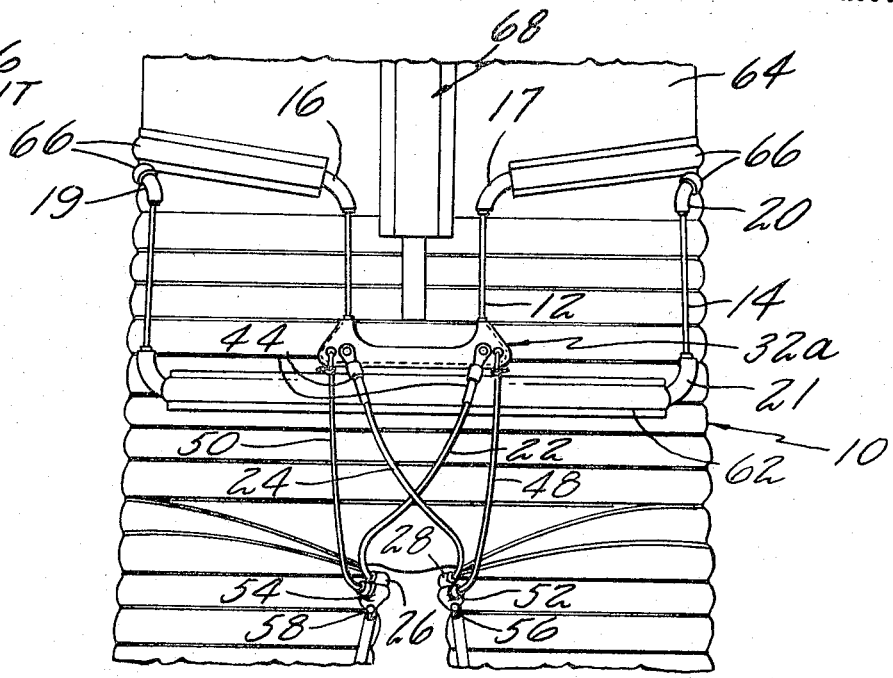
FIG. 7 REAR
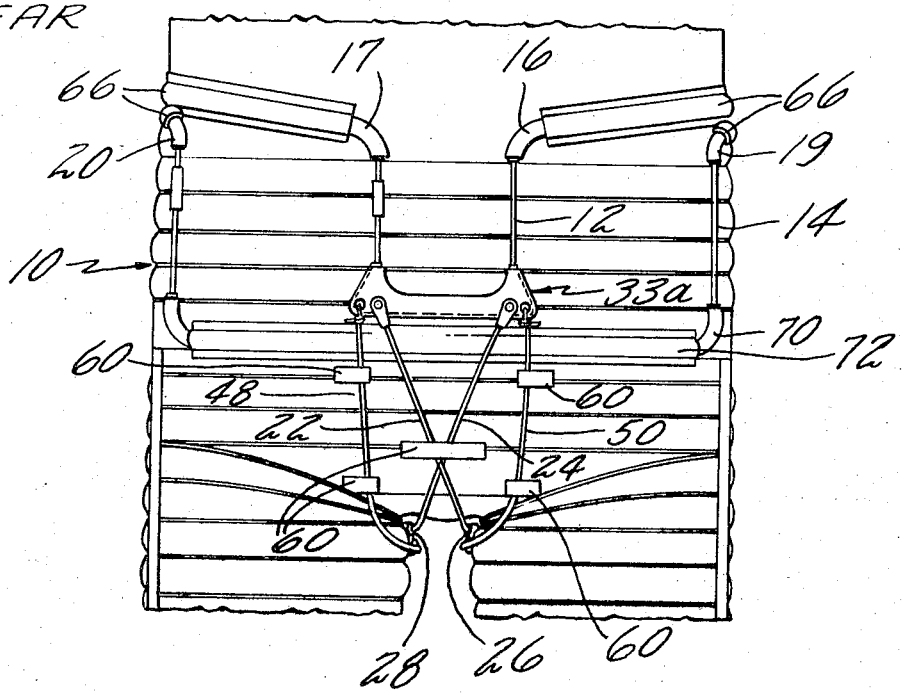
FIG. 8
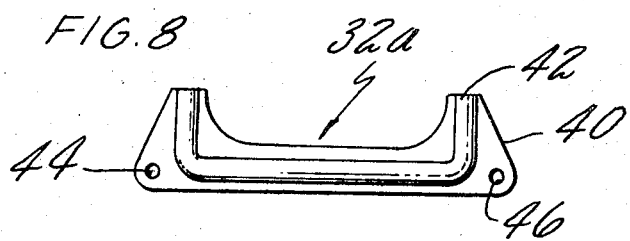

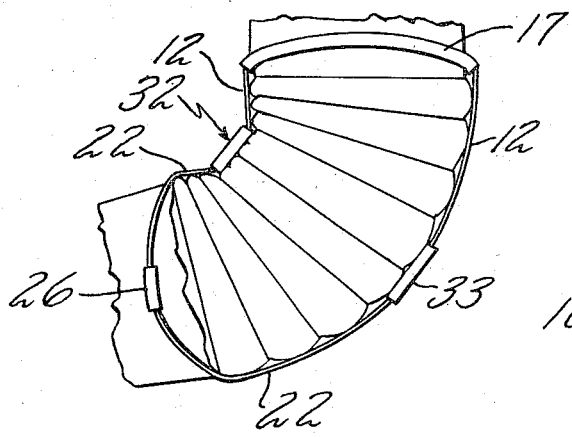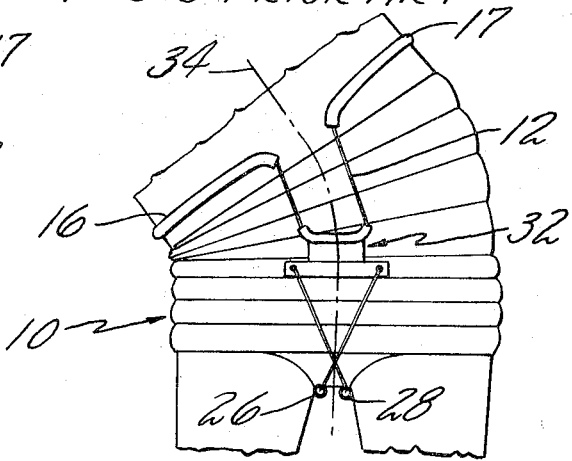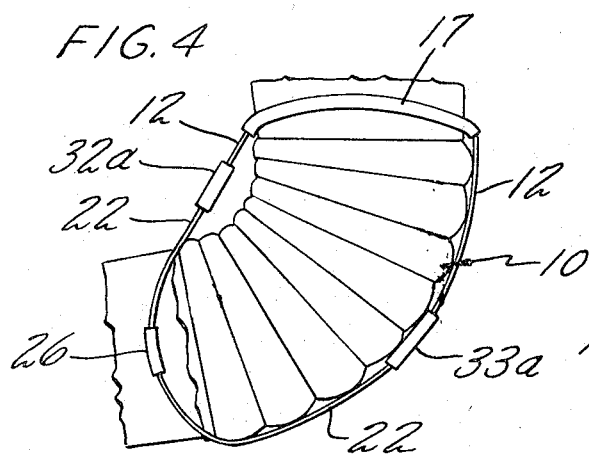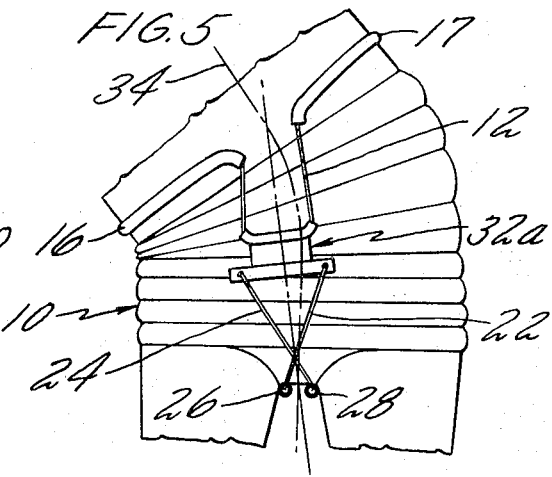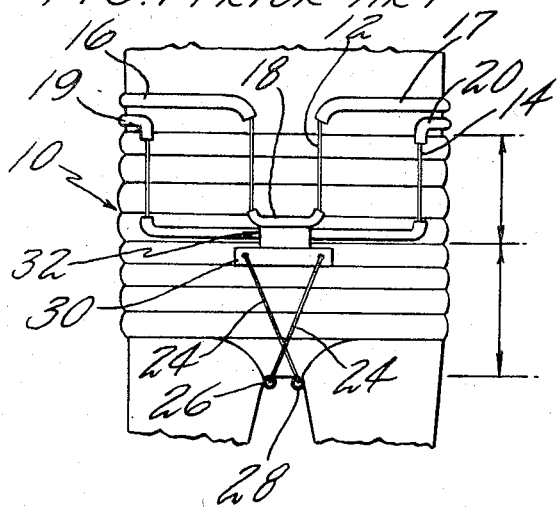

United States Patent Office 3,562,809
Patented Feb. 16, 1971

3,562,809
FLOATING YOKE CABLE RESTRAINT SYSTEM FOR A PRESSURIZED SUIT
John C. Hardy, Weatogue, and Douglas E. Getchell, Windsor Locks, Conn., assignors to United Aircraft Corporation, East Hartford, Conn., a corporation of Delaware
Filed Dec. 20, 1968, Ser. No. 785,604
Int. Cl. A62b 17/00
U.S. Cl. 2—2.1
1 Claim

ABSTRACT OF THE DISCLOSURE

Waist and crotch restraint cables are connnected together to provide plug load restraint continuity from the thighs to the mid trunk area of a pressurized suit by means of floating yokes disposed in the middle of the stomach and over the buttocks.

BACKGROUND OF THE INVENTION

Field of invention

This invention relates to pressurized suits, and more particularly to improvements in restraint systems therefor.

Description of the prior art

In the field of design of pressurized suits of the type used in high altitude aviation and space exploration, it has long been known that the suits become extremely stiff under pressure. This is so even though the restraint layer of the suit may be made of a material which is flexible when not pressurized, such as cloth. One of the problems of space suits known to the art is the great difficulty had with bending or flexing the waist, not only in a forward direction, but from side to side. The difficulty is caused by the great forces tending to keep the suit straight, and the extreme volume changes which occur as a result of flexing at the waist.

In order to provide more mobility at the waist and hip area of pressurized suits known to the art, restraining cables have been designed so as to facilitate mobility, and the restraint layer of the suit has also been designed to facilitate mobility. For instance, a cloth restraint system for the lower trunk is illustrated in a co-pending application of the same assignee entitled Pressurized Suit Hip-Waist, Ser. No. (UAC Docket No. HSA-373) filed on even date herewith by D. E. Getchell and M. A. Marroni. A waist cable restraint system which provides great flexibility and mobility at the waist is illustrated in a co-pending application of the same assignee entitled Universal Cable Restrained Waist Joint for a Pressurized Suit, Ser. No. 710,387, filed on Mar. 4, 1968 by E. G. Vail and D. E. Getchell. Each of these cable restraint systems causes the related area of the pressurized suit to function as an independent portion of the suit. This provides good mobility, but leaves something to be desired in terms of the overall mobility from the thighs up to the chest.

SUMMARY OF INVENTION

The object of the present invention is to provide an improved restraint system for a pressurized suit, particularly in the mid section of the suit.

According to the present invention, it has been discovered that cable restraint systems operative in the area between the thighs and the chest in a pressurized suit have heretofore operated as independent mobility joint restraint systems, and that providing a unitary mobility joint from the lower chest through to the thighs will significantly increase mobility of a pressurized suit, particularly in such functions as flexure in the frontal plane and flexure in the sagittal plane (such as sitting down.) In further accord with the present invention, a waist cable restraint system which defines an omnidirectional waist joint is joined together at the front and rear with a unidirectional cable restraint system for the hip-thigh area. According still further to the present invention, the joining of the waist and hip-crotch cable restraint systems is effected on floating members, herein referred to as yokes, at both the front and the rear of the suit, whereby the restraint systems are combined into a single unitary mobility joint having both omnidirectional and unidirectional characteristics, thereby to achieve omnidirectionality to the same extent as the natural mobility of the wearer of the pressurized suit incorporating the present invention.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

FIG. 1 is a front elevation of a pressurized suit known to the prior art, illustrating a waist mobility joint cable restraint system and a hip-crotch mobility joint cable restraint system joined together at fixed points at the front (and rear) of a pressurized suit;

FIG. 2 is a side elevation of the hip-waist restraint system illustrated in FIG. 1, with the left thigh broken away, under a condition of extreme forward flexure;

FIG. 3 is a front elevation of the prior art hip-waist of FIG. 1 illustrating flexure to the right;

FIG. 4 is a side elevation of a cable restraint system in accordance with the present invention, with the left thigh broken away, illustrating forward flexure;

FIG. 5 is a front elevation of a hip-waist mobility joint cable restraint system in accordance with the present invention illustrating flexure to the right;

FIG. 6 is a front elevation of the detailed construction of a hip-waist mobility joint restraint system in accordance with the present invention;

FIG. 7 is a rear elevation of the hip-waist illustrated in FIG. 6; and

FIG. 8 is a detailed side elevation of a floating yoke suitable for use in the present invention.

DESCRIPTION OF THE PREFERRED EMBODIMENT

Referring now to FIG. 1, a recently innovated restraint system for the mid section of a pressurized suit is shown to include a convoluted lower trunk restraint layer 10, a pair of waist restraint cables 12, 14, each of the cables being slidably disposed in respective turnaround guides 16–21. It also includes a pair of hip restraint cables 22, 24 which cross in the front and pass through respective sliding guides 26, 28 at the crotch, again cross, and are terminated in the middle of the back. A back elevation view of the system of FIG. 1 appears almost identical with the front view, and is therefore not shown herein for purposes of simplicity. The turnaround guides 18 and 21, as well as a plate 30 to which the hip restraint cables 22 and 24 are terminated may all comprise a single structural unit, or may comprise individual units. However, if a single unit is taken as an example, this unit (member 32) has heretofore been affixed to the cloth of the convolute section 10, and a similar unit 33 has been affixed to the cloth at the rear of the convolute section 10 (shown in FIG. 2). Because of this factor, the waist restraint cables 12, 14 operate as a unitary omnidirectional mobility joint restraint system, and the hip cables 22, 24 operate as a distinct unitary unidirectional mobility joint restraint system. This is illustrated more fully in FIGS. 2 and 3 wherein it can be seen that the member 32 remains fixed to the convoluted restraint section 10, even when by so doing, the restraint cables (exemplified in FIG. 2 by cables 12 and 22) have to traverse a tortuous route, and cannot assume the shortest distance between their extreme turnaround guides. It should be noted that the lower waist cable 14, and the sliding guides therefor have been eliminated from FIGS. 2 and 3 herein for simplicity, since these are not directly involved with the present invention, as is decribed more fully hereinafter. Similarly, FIG. 3 illustrates that under flexure, the waist turnaround guides 16, 17 can follow the bending motion of the wearer, but the central member 32 remains fixed at the center of the lower trunk (and similarly in the rear). Since the member 32 does not assume any different position as a result of the side flexure, the hip restraint system remains isolated from the waist restraint system, and does not aid in side flexure as illustrated in FIG. 3. Notice that the member 32 remains on the center line 34 of the assembly, even when in extreme right-hand flexure as illustrated in FIG. 3.

The present invention improves mobility of the central section of the pressurized suit by substituting in place of the fixed members 32, 33 novel floating yokes 32a, 33a as illustrated in FIGS. 4–8.

Referring now to FIG. 4, the front floating yoke 32a is seen to be free of the convolute section 10 and therefore able to assume a position within a direct line between the turnaround guides 16, 17 and the crotch of the suit, due to tension in the restraint cables 12, 22 and 24. In FIG. 5, it can be seen that the floating yoke 32a will move to the right of the suit (to the left as shown in FIG. 5) as a result of rightward flexure so that it no longer is on the center line 34 of the pressurized suit. This maintains less acute angles in the waist restraint cable 12, as can be seen by comparing FIGS. 3 and 5 with respect to the angle of the cable 12 as it leaves the member 32 in proceeding toward the turnaround guide 17, with the lesser angle of the cable 12 as it leaves the floating yoke 32a and proceeds towards the turnaround guide 17 in FIG. 5. It should be noted that the rear floating yoke 33a will similarly move to the right of the suit as a result of rightward flexure.

In a similar fashion, the floating yokes 32a, 33a can move freely, within the constraints of the restraint cables 12, 22 and 24, in any direction, even in directions of flexure not capable of being achieved by the wearer of the suit.

The best mode contemplated of practicing the invention is illustrated in FIGS. 6–8. In FIG. 6, it is seen that the floating yoke 32a is suspended between the waist restraint cable turnaround guides 16, 17 and the crotch turnaround guides 26, 28. Its only constraint on position is the connection thereto with the waist cable 12 and with the hip-crotch cables 22, 24. Referring to FIG. 8, the floating yoke 32a is shown in a reverse position from its illustration in FIG. 6. It may preferably comprise a plate 40 having a tube 42 disposed thereon, such as by welding or other suitable means. The tube 42 forms the sliding turnaround guide (similar to turnaround guide 18 illustrated in FIG. 1) for the upper waist restraint cable 12. The plate 40 is suitable to receive swaged fittings 44 (FIG. 6) which may be utilized to secure the hip-waist restraint cables 22, 24 to the floating yoke 32a. It is also provided with a pair of holes 44, 46 to which a pair of cords 48, 50 may be tied. These cords are passed through sliding turnaround guides 52, 54 which are disposed in the crotch adjacent to the guides 26, 28. All of these guides are disposed on plates secured to the cloth of the restraint thighs together with dorsal plug load restraint cables 56, 58 of the type known to the prior art, which may run down the entire length of the leg. The purpose of the cords 48, 50 is to tend to distribute the cutting-in effect of the restraints 22, 24 at the lower abdomen and at the buttocks, and to keep yokes 32a and 33a parallel to each other at all times. These cords and the hip restraint cables 22, 24 may be secured at the rear (FIG. 7) by suitable tunnel tapes 60 so as to limit the creeping of the position of these cords and restraints at the rear of the suit as a result of repeated flexure in various directions. The position of the cords 48, 50 may be adjusted from time to time by the wearer for maximum comfort. These cords, as well as the actual hip restraint cables 22, 24 were known in the art prior to this invention.

Note that the lower waist cable 14 is not joined with the floating yoke, due to the fact that the turnaround 21 therefor is secured directly to the convolute restraint section 10 by a suitable tunnel tape 62. In a similar fashion the guides 16, 17, 19 and 20 may all be secured to the convolute section 10 or to a waist section 64 (which joins the convolute section 10) by suitable tunnel tapes 66. In FIG. 6, the general position of a closure (which may include a zipper and seal) to permit entry into the suit is indicated generally at 68. This forms no part of the present invention.

Referring now to FIG. 7, the lower waist restraint cable 14 is provided with a turnaround sliding guide 70 in the back, which is secured to the convolute section 10 by a tunnel tape 72. It is to be noted that the floating yoke 33a in the back of the suit is identical to the floating yoke 32a at the front of the suit, as described hereinbefore.

The details of FIG. 6 and FIG. 7 are not all germane to the present invention, but a number of them tend to complete the environment within which the present invention may be practiced. The invention, however, may be practiced with a variety of other pressurized suit configurations. The essential elements of the present invention are that a waist cable restraint system is joined with a hip-crotch cable restraint system at floating yokes in the front and in the rear. Thus, although the invention has been shown and described with respect to a preferred embodiment thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. In a pressurized suit including a convoluted lower trunk section having a front region adapted to be disposed over the stomach and a back region adapted to be disposed over the buttocks of the wearer thereof, and including a crotch portion, a restraint system comprising:

a combined plug load restraining and hoop load restraining waist restraint means including a waist cable and a plurality of first pair of turnaround cable guide means adapted for connection with said suit to cause said waist cable to traverse the waist about the sides of the convoluted lower trunk section;

a pair of free floating restraint yokes, a first one of said pair of free floating yokes adapted for positioning substantially centrally over the front region of the convoluted lower trunk section, the other one of said pair of free floating yokes adapted for positioning substantially centrally over the back region of the convoluted lower trunk section, each free floating restraint yoke adapted to move freely off center from side to side, said first one of said pair of free floating yokes adapted to move freely away from the convoluted lower trunk section, each of said free floating yokes including a related one of a second pair of turnaround cable guide means adapted to cause said waist cable to dip downwardly over the front and back regions, respectively, of the convoluted lower trunk section; and crotch restraint means including crotch cable means connected at each of its ends to respective ones of said free floating restraint yokes and adapted to pass about the crotch portion of the convoluted lower trunk section, whereby said floating restraint yokes are positioned in response only to the forces applied thereto by said waist and crotch restraint means.

References Cited

UNITED STATES PATENTS

| | | | | |
|---|---|---|---|---|
| 2,894,535 | 7/1959 | Hansen | 138—49 |
| 3,074,669 | 1/1963 | Bohlin | 2—2X |
| 3,286,274 | 11/1966 | O'Kane | 2—2.1 |
| 3,428,961 | 2/1969 | Schueller | 2—2.1 |

JORDAN FRANKLIN, Primary Examiner

G. H. KRIZMANICH, Assistant Examiner